United States Patent [19]

Nakajima

[11] Patent Number: 4,843,240
[45] Date of Patent: Jun. 27, 1989

[54] RADIATION IMAGE RECORDING AND READ-OUT APPARATUS

[75] Inventor: Nobuyoshi Nakajima, Kanagawa, Japan

[73] Assignee: Fuji Photo Film Co., Ltd., Kanagawa, Japan

[21] Appl. No.: 182,821

[22] Filed: Apr. 18, 1988

[30] Foreign Application Priority Data

Apr. 17, 1987 [JP] Japan .................. 62-94550

[51] Int. Cl.$^4$ .............................. G03B 42/02
[52] U.S. Cl. .................. 250/327.2; 250/484.1; 378/154
[58] Field of Search .............. 250/484.1 B, 327.2 J, 250/327.2 C, 327.2 B; 378/155, 154

[56] References Cited

U.S. PATENT DOCUMENTS

| 4,258,264 | 3/1981 | Kotera et al. | 250/484.1 |
| 4,276,473 | 6/1981 | Kato et al. | 250/327.2 |
| 4,315,318 | 2/1982 | Kato et al. | 382/6 |
| 4,387,428 | 6/1983 | Ishida et al. | 364/413.13 |
| 4,400,619 | 8/1983 | Kotera et al. | 250/327.2 |
| 4,731,806 | 3/1988 | Takahata | 378/155 |

FOREIGN PATENT DOCUMENTS

| 0114978 | 8/1984 | European Pat. Off. | 250/327.2 J |
| 0220629 | 5/1987 | European Pat. Off. | 250/327.2 |
| 56-11395 | 2/1981 | Japan | 250/327.2 |
| 59-192240 | 10/1984 | Japan | 250/327.2 K |
| 61-278843 | 12/1986 | Japan | 250/327.2 C |
| 62-92932 | 4/1987 | Japan | 250/327.2 H |

Primary Examiner—Janice A. Howell
Assistant Examiner—Constantine Hannaher
Attorney, Agent, or Firm—Sughrue, Mion, Zinn, Macpeak, and Seas

[57] ABSTRACT

A radiation image recording and read-out apparatus comprises a recording and read-out unit provided with a case which houses a stimulable phosphor sheet and having a size nearly equal to the size of a single image recording area on the stimulable phosphor sheet, an image recording section for recording a radiation image on the stimulable phosphor sheet, an image read-out section for reading out the radiation image from the stimulable phosphor sheet, and an erasing section. The apparatus also comprises a grid device provided with a grid having a size nearly equal to the size of the case, and a unit movement system for moving the recording and read-out unit so that the recording and read-out unit takes a first image recording position at which the image recording section faces the grid device, and a second image recording position at which the image recording section deviates from the position facing the grid device.

5 Claims, 7 Drawing Sheets

RADIATION IMAGE RECORDING AND READ-OUT APPARATUS

BACKGROUND OF THE INVENTION

1. Field of the Invention

This invention relates to a radiation image recording and read-out apparatus for recording a radiation image on a stimulable phosphor, exposing the stimulable phosphor to stimulating rays which cause the stimulable phosphor to emit light in proportion to the stored radiation energy, detecting the emitted light to read out the radiation image, and converting the emitted light into electric signals. This invention particularly relates to a radiation image recording and read-out apparatus which enables selection of use or disuse of a grid device in accordance with an image recording portion of an object or the like.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then scanned with stimulating rays which cause it to emit light in proportion to the stored radiation energy. The light emitted by the stimulable phosphor sheet upon stimulation thereof is photoelectrically detected and converted to electric image signals, which are processed as desired to reproduce a visible image having an improved image quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom on a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for carrying out the aforesaid radiation image recording and reproducing method and moves from place to place to record radiation images for mass medical examinations, it is disadvantageous to load the mobile X-ray diagnostic station with a large number of stimulable phosphor sheets, and the number of the stimulable phosphor sheets which can be loaded on the mobile X-ray diagnostic station is limited. Therefore, it is desired to load the mobile X-ray diagnostic station with stimulable phosphor sheets which can be used repeatedly, once store the radiation images of the objects respectively on the stimulable phosphor sheets, transfer the electric image signals read out from the stimulable phosphor sheets to a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examination. This is very advantageous in practical use.

In order to reuse stimulable phosphor sheets as mentioned above, the radiation energy remaining on the stimulable phosphor sheet after it is scanned with stimulating rays to read out the radiation image stored thereon should be erased by exposing the stimulable phosphor sheet to light or heat as described in, for example, U.S. Pat. No. 4,400,619 or Japanese Unexamined Patent Publication No. 56(1981)-12599. The stimulable phosphor sheet should then be used again for radiation image recording.

From the aforesaid viewpoint, the applicant proposed in Japanese Unexamined Patent Publication No. 59(1984)-192240 a radiation image recording and read-out apparatus comprising:

(i) a circulation and conveyance means for conveying at least one stimulable phosphor sheet for recording a radiation image thereon along a predetermined circulation path, (ii) an image recording section disposed on the circulation path for recording a radiation image of an object on the stimulable phosphor sheet by exposing the stimulable phosphor sheet to a radiation passing through the object, (iii) an image read-out section disposed on the circulation path and provided with a stimulating ray source for emitting stimulating rays for scanning the stimulable phosphor sheet carrying the radiation image stored thereon at the image recording section, and a photoelectric read-out means for detecting light emitted by the stimulable phosphor sheet scanned with the stimulating rays to obtain electric image signals, and (iv) an erasing section disposed on the circulation path for, prior to the next image recording on the stimulable phosphor sheet for which the image read-out has been carried out at the image read-out section, having the stimulable phosphor sheet release the radiation energy remaining on the stimulable phosphor sheet, whereby the stimulable phosphor sheet is circulated through the image recording section, the image read-out section and the erasing section, and reused for radiation image recording.

With the radiation image recording and read-out apparatus having such a configuration, the radiation image recording and read-out can be carried out sequentially and efficiently. However, the proposed radiation image recording and read-out apparatus becomes comparatively large because of the provision of the circulation path for the stimulable phosphor sheet in the apparatus.

On the other hand, at the aforesaid image recording section, it is often necessary to use a grid device such as a bucky device, depending on the object portion the image of which is to be recorded. Specifically, in the case where an image of a thick object portion such as the chest is to be recorded, the radiation scattered by the object often causes the image quality to deteriorate. Therefore, in this case, a grid device having a grid for absorbing the scattered radiation, or a bucky device provided with the grid and a means for reciprocally moving the grid should be disposed between the object and the stimulable phosphor sheet. On the other hand, the grid device is not necessary in the case where an image of a thin object portion or the like is to be recorded. Accordingly, it is necessary to mount the grid device on the apparatus and dismount the grid device therefrom in accordance with the image recording portion of the object. However, the grid device is generally large and heavy, and it is very troublesome to repeat mounting and dismounting of the grid device on the apparatus. Also, in the case where a mechanism for mounting and dismounting the grid device is provided, the distance between the object and the stimulable phosphor sheet becomes long, and geometric blur arises.

SUMMARY OF THE INVENTION

The primary object of the present invention is to provide a radiation image recording and read-out apparatus wherein a stimulable phosphor sheet is used repeatedly for image recording and which enables selection of use or disuse of a grid device without the grid device being moved.

Another object of the present invention is to provide a radiation image recording and read-out apparatus wherein a grid device is provided, and wherein the distance between an object and a stimulable phosphor sheet is adjusted to be short and geometric blur is minimized at the time image recording is carried out without the grid device being used.

In the radiation image recording and read-out apparatus in accordance with the present invention, instead of conveying a stimulable phosphor sheet sequentially to an image recording section, an image read-out section and an erasing section along a circulation and conveyance path, a small recording and read-out unit containing a stimulable phosphor sheet and having the image recording, read-out and erasing functions is provided.

Specifically, the present invention provides a radiation image recording and read-out apparatus which comprises:

(i) a recording and read-out unit provided with:

(a) a case for housing therein a stimulable phosphor sheet and having longitudinal and transverse dimensions approximately equal to the longitudinal and transverse dimensions of a single image recording area on said stimulable phosphor sheet, (b) an image recording section for holding said stimulable phosphor sheet in said case at an image recording position exposed to radiation passing through an object, and having a radiation image of said object stored on said stimulable phosphor sheet, (c) an image read-out section provided in said case for exposing said stimulable phosphor sheet carrying said radiation image stored thereon to stimulating rays which cause said stimulable phosphor sheet to emit light in proportion to the stored radiation energy, and photoelectrically detecting the emitted light to obtain image signals, and (d) an erasing section provided in said case for releasing the radiation energy remaining on said stimulable phosphor sheet, for which the detection of said emitted light has been carried out, before the image recording is carried out on said stimulable phosphor sheet, (ii) a grid device provided with a grid having a size approximately equal to the longitudinal and transverse dimensions of said case, and (iii) a unit movement means for moving said recording and read-out unit so that said recording and read-out unit takes a first image recording position at which said image recording section faces said grid device, and a second image recording position at which said image recording section deviates from the position facing said grid device.

The term "grid device" as used herein embraces an ordinary device provided with a grid alone, and a bucky device provided with the grid and a means for reciprocally moving the grid.

With the radiation image recording and read-out apparatus in accordance with the present invention wherein the small recording and read-out unit is provided, the recording and read-out unit can be moved easily by a simple movement means. Therefore, the grid device is secured, and the recording and read-out unit is moved with respect to the grid device, so that changeover between the image recording by use of the grid device and the image recording without the grid device being used is effected easily.

As mentioned above, with the radiation image recording and read-out apparatus in accordance with the present invention wherein the recording and read-out unit comprising the case having the longitudinal and transverse dimensions approximately equal to the single radiation image recording area, and the image recording section, the image read-out section and the erasing section housed in the case is used, the recording and read-out unit is light and small. As the recording and read-out unit is moved with respect to the grid device, use and disuse of the grid device in the course of the image recording can be selected markedly easily as compared with the case wherein the grid device is mounted and dismounted in the course of the image recording. Also, in the course of the image recording carried out without the grid device being used, the distance between the object and the stimulable phosphor sheet can be made short and geometric blur can be minimized.

DESCRIPTION OF THE PREFERRED EMBODIMENTS

The present invention will hereinbelow be described in further detail with reference to the accompanying drawings.

Figure 1:
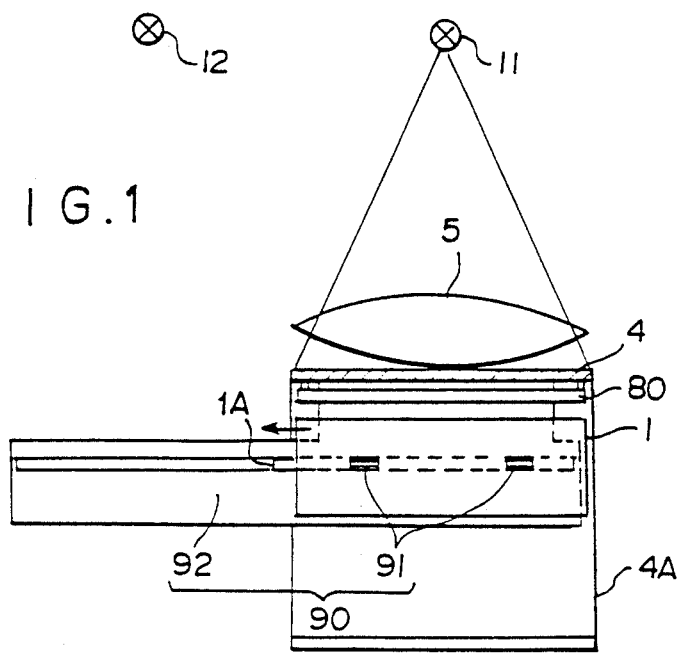
FIGS. 1 and 2 are schematic side views showing an embodiment of the radiation image recording and read-out apparatus in accordance with the present invention.
Figure 2:
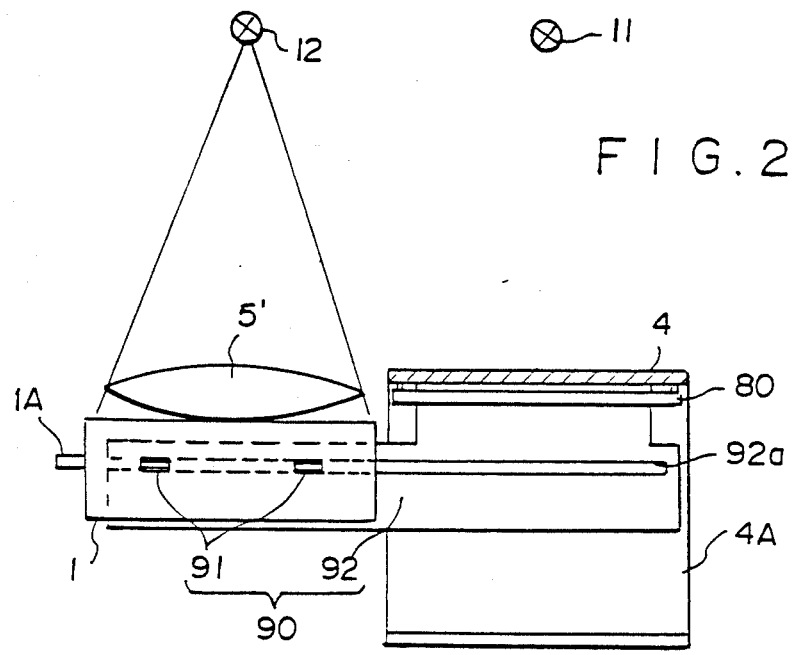
Figure 3:
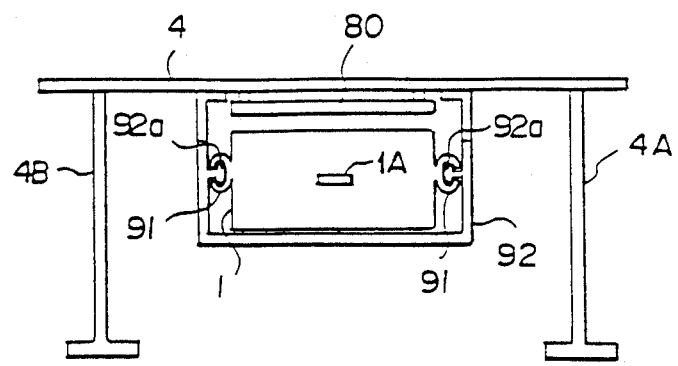
FIG. 3 is a schematic elevational view showing the embodiment shown in FIG. 1, FIGS. 4 and 5 are a side view and a plan view showing the recording and read-out unit employed in the embodiment shown in FIG. 1, FIGS. 6A and 6B are a partially cutaway perspective view and a sectional side view showing the photomultiplier employed in the recording and read-out unit shown in FIG. 4.

With reference to FIGS. 1, 2 and 3, an embodiment of the radiation image recording and read-out apparatus in accordance with the present invention is provided with a recording and read-out unit 1 composed of a case as will be described later, and an image recording section, an image read-out section and an erasing section housed in the case. The embodiment is also provided with a unit movement means 90 for moving the recording and read-out unit 1 so that it takes a first image recording position as shown in FIG. 1 and a second image recording position as shown in FIG. 2, and a radiation-permeable object support 4 supported by leg members 4A and 4B and disposed above the recording and read-out unit 1 at its first image recording position. The embodiment is further provided with a bucky device 80 mounted on the lower surface of the object support 4 and positioned between the recording and read-out unit 1 and the object support 4 at the time the recording and read-out unit 1 is present at its first image recording position. Radiation sources 11 and 12 are provided respectively above the first image recording position and the second image recording position of the recording and read-out unit 1. A movement guide member 92 extending in the direction of movement of the recording and read-out unit 1 is provided inward from the leg members 4A and 4B. As shown in FIG. 3, protrusions 92a, 92a extending in the direction of movement of the recording and read-out unit 1 are formed on the inner side surfaces of the movement guide member 92. The unit movement means 90 is constituted by the movement guide member 92, and engagement portions 91, 91, . . . formed on the side surfaces of the recording and read-out unit 1 for engagement with the protrusions 92a, 92a. A handle 1A is secured to the front surface of the recording and read-out unit 1 so that the operator for the apparatus can move the recording and read-out unit 1 between its first image recording position and its second image recording position by gripping the handle 1A. The recording and read-out unit 1 may also be moved by a drive device between the two image recording positions.

In the case where an object 5 the image of which is to be recorded is of the type readily scatters much radiation, the object 5 is placed on the object support 4 as shown in FIG. 1, the recording and read-out unit 1 is maintained at its first image recording position below the bucky device 80, and the image recording using the radiation source 11 is carried out via the bucky device 80. The bucky device 80 is provided therein with a grid having a size approximately equal to the longitudinal and transverse dimensions of the case, and a means for reciprocally moving the grid. The image recording at the first image recording position, the image read-out and the erasing will hereinbelow be described together with the configuration of the recording and read-out unit 1 with reference to FIG. 4.

In the recording and read-out unit 1, an endless recording belt 2 composed of an endless belt on which a stimulable phosphor layer is formed over the overall surface to constitute a stimulable phosphor sheet is housed in a case 7, and is applied around a first roller section 40 constituted by rollers 41 and 42, and a second roller section 50 constituted by rollers 51 and 52 and spaced by a predetermined distance from the first roller section 40. The recording belt 2 is conveyed and circulated in the direction as indicated by the arrow around the first roller section 40 and the second roller section 50. The radiation source 11 is disposed at the position facing the recording and read-out unit 1 via the object 5 and the bucky device 80. An image recording section 10 is set at the part at which the recording belt 2 is held at the position exposed to radiation, i.e. between the rollers 41 and 51 in the recording and read-out unit.

When the radiation produced by the radiation source 11 is irradiated to the object 5 placed on the image recording table 4, an image of the radiation passing through the object 5 is projected onto the recording belt 1 via the bucky device 80. In this manner, the radiation image of the object 5 is stored on the stimulable phosphor layer of the recording belt 2. At this time, the radiation scattered by the object 5 is substantially intercepted by the bucky device 80. Also, the distance between the first roller section 40 and the second roller section 50 is adjusted to be approximately equal to the length of a single image formed by the image recording. Therefore, the aforesaid radiation image is stored over the overall area of the upper side region of the recording belt 2 in FIG. 4 by a single image recording step.

Figure 4:
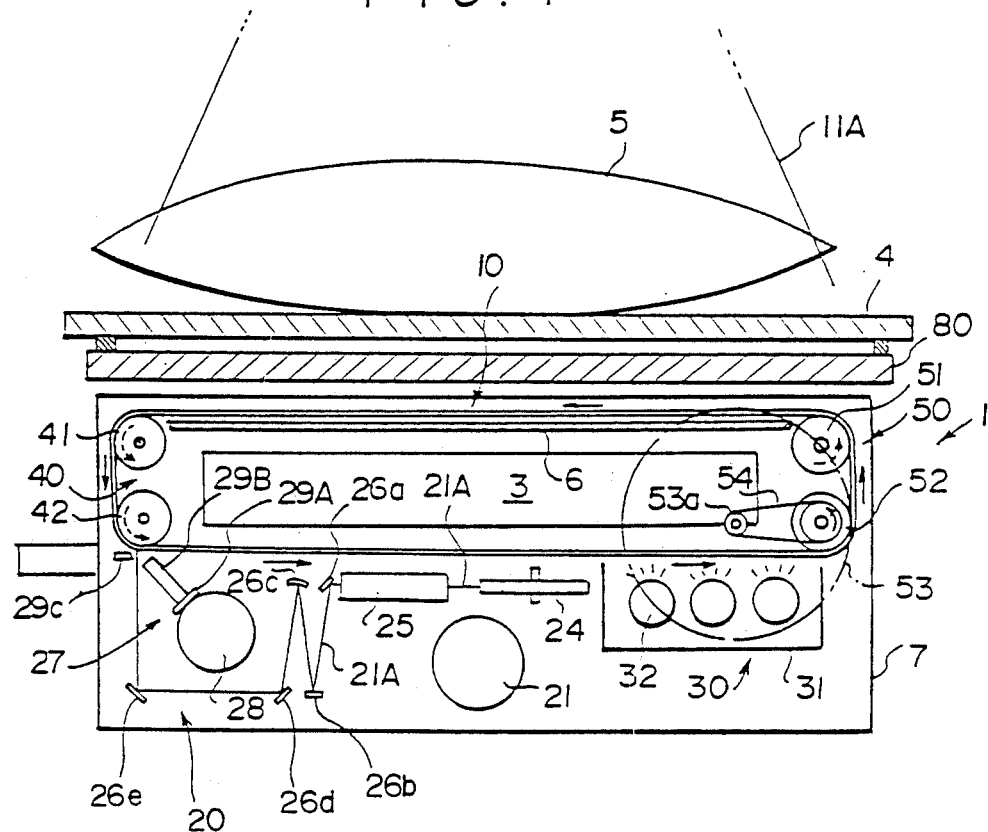
Figure 5:
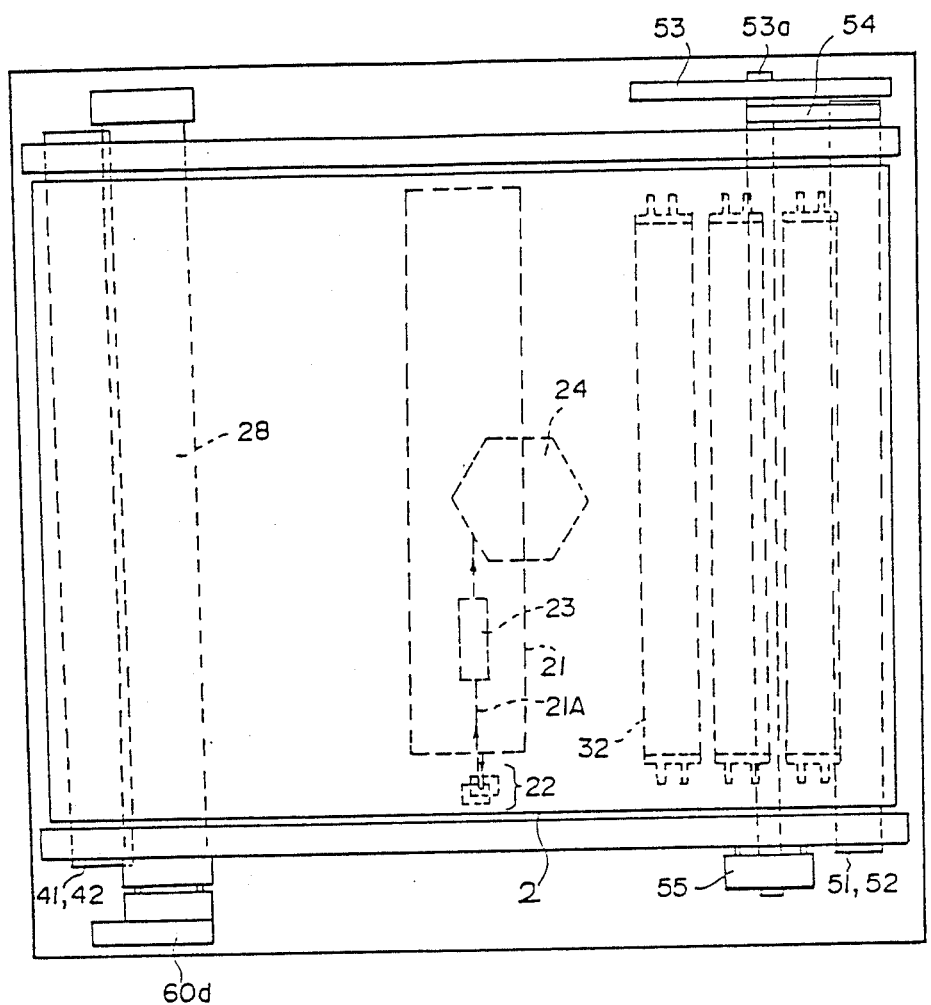

As long as the image recording is being carried out, the recording belt 2 is maintained stationary at a predetermined position so that the portion of the recording belt 2 on which the image recording is carried out faces the radiation source 11. When the image recording is finished, the recording belt 2 is conveyed by rollers 41, 42, 51 and 52 rotated in the directions as indicated by the arrows, and the image-recorded portion of the recording belt 2 is conveyed to an image read-out section 20 disposed on the left side below the recording belt 2 in the case 7 in FIG. 4. Of the rollers 41, 42, 51 and 52, the roller 52 is a drive roller connected with a shaft 53a of a motor 53 by a belt or a chain, and the other rollers 41, 42 and 51 are driven rollers which rotate by following up the drive roller 52. As shown in FIG. 5, a rotary encoder 55 is secured to the shaft 53a of the motor 53 for detecting the rotation of the motor 53 and carrying out various control items.

At the image read-out section 20, a stimulating ray source 21 constituted by a He-Ne laser or the like for producing stimulating rays 21A extends normal to the direction of conveyance of the recording belt 2. Also, a rotating polygon mirror 24 as a light deflector for scanning the stimulating rays 21A on the recording belt 2 in the width direction of the recording belt 2, i.e. in the main scanning direction at an angle normal to the drawing sheet in FIG. 4, is provided in the optical path of the stimulating rays 21A. As shown in FIG. 5, the optical path of the stimulating rays 21A produced by the stimulating ray source 21 is changed by a mirror group 22, and then the stimulating rays 21A pass through a light input optical system 23 provided with a beam expander, a cylindrical lens or the like, and impinge upon the rotating polygon mirror 24. As shown in FIG. 4, the stimulating rays 21A reflected and deflected by the rotating polygon mirror 24 pass through a scanning optical system 25 composed of an fθ lens or the like, the optical path of the stimulating rays 21A is changed by mirrors 26a, 26b, 26c, 26d and 26e, and then the stimulating rays 21A repeatedly scan the recording belt 2 on the lower circumferential surface of the roller 42 in FIG. 4 in the main scanning direction. The mirror 26c is a cylindrical mirror for converging the stimulating rays 21A only in a plane parallel to the drawing sheet in FIG. 4. In the aforesaid optical system, the mirror 26c and the cylindrical lens in the aforesaid light input optical system 23 prevent pitch nonuniformity of scanning lines from arising on the recording belt 2 even though axis deviation, mirror surface inclination or the like arises with the rotating polygon mirror 24. Simultaneously with the main scanning by the stimulating rays 21A, the recording belt 2 is conveyed by the rollers 41, 42, 51 and 52 in the subscanning direction as indicated by the arrow in FIG. 4 at a predetermined speed. Accordingly, the stimulating rays 21A are irradiated to nearly the overall surface of the recording belt portion carrying the radiation image stored thereon at the image recording section 10.

Figure 6:
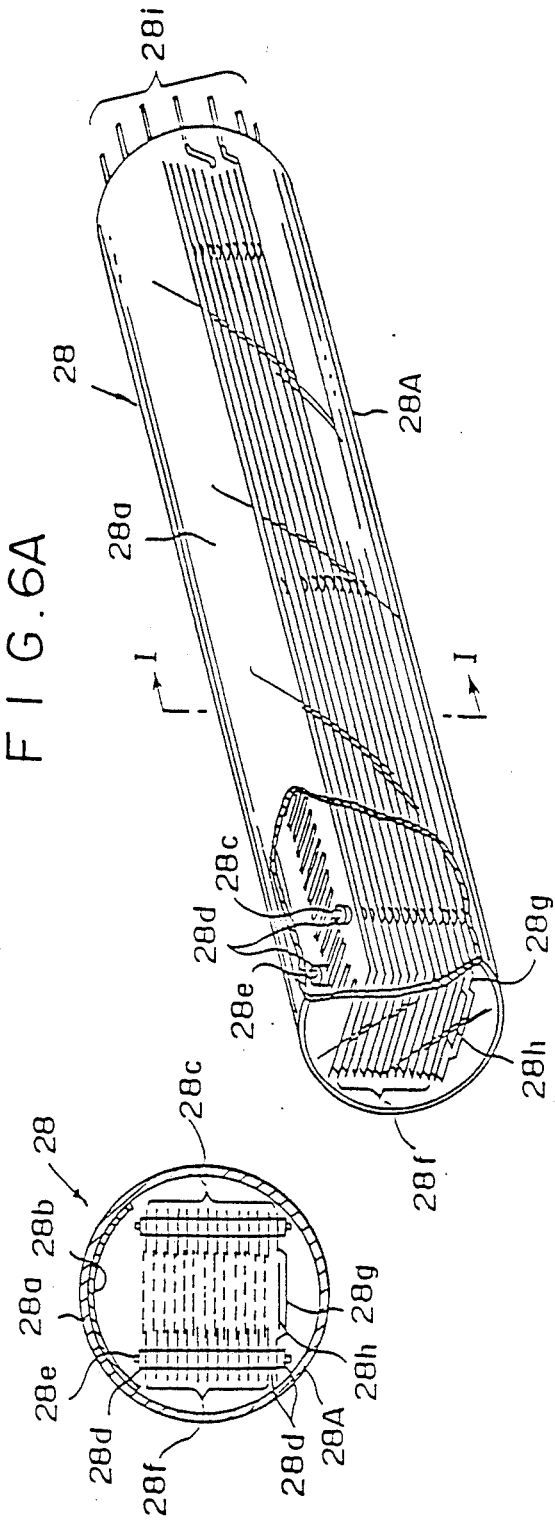

As the recording belt 2 is exposed to the stimulating rays 21A, the exposed part of the recording belt 2 emits light in proportion to the stored radiation energy, and the emitted light is detected by a photoelectric read-out means 27. In this embodiment, the photoelectric read-out means 27 comprises a long photomultiplier 28 extending in the main scanning direction at least over the length of the main scanning line, a filter 29A closely contacted with the light receiving face of the photomultiplier 28 for selectively transmitting only the light emitted by the recording belt 2 and preventing entry of the stimulating rays 21A reflected by the surface of the recording belt 2 to the photomultiplier 28, and a light guide member 29B closely contacted with the light input face of the photomultiplier 28 via the filter 29A for substantially guiding the light emitted by the recording belt 2 to the photomultiplier 28. By way of example, as shown in FIGS. 6A and 6B, the photomultiplier 28 has an electrode configuration generally called the venetian blind type. Also, a mirror 29C is disposed to face the photoelectric read-out means 27 via the scanning line for efficiently reflecting the light, which is emitted by the recording belt 2 toward the mirror 29C, to the light receiving face of the light guide member 29B. With reference to FIGS. 6A and 6B, the photomultiplier 28 comprises a cylindrical body 28A, a photocathode 28b disposed along the inner surface of the body 28A to face a light receiving face 28a, and a multiplying section 28f disposed under the photocathode 28b and including a plurality (13 pieces in this embodiment) of plate-like dynodes 28c which are stacked via insulating members 28d, 28d secured by pins 28e, 28e. The dynodes 28c are respectively constituted by a conductive plate provided with a plurality of sections cut in a U-shape and bent to form a blind-like shape. A shield electrode 28g is secured by the pins 28e, 28e under the multiplying section 28f via the insulating members 28d, 28d, and an anode 28h is disposed inside of the shield electrode 28g. These electrodes are electrically connected in one-to-one relation with terminals of a terminal group 28i disposed at the side end of the body 28A. The shield electrode 28g need not necessarily be provided.

Figure 7:
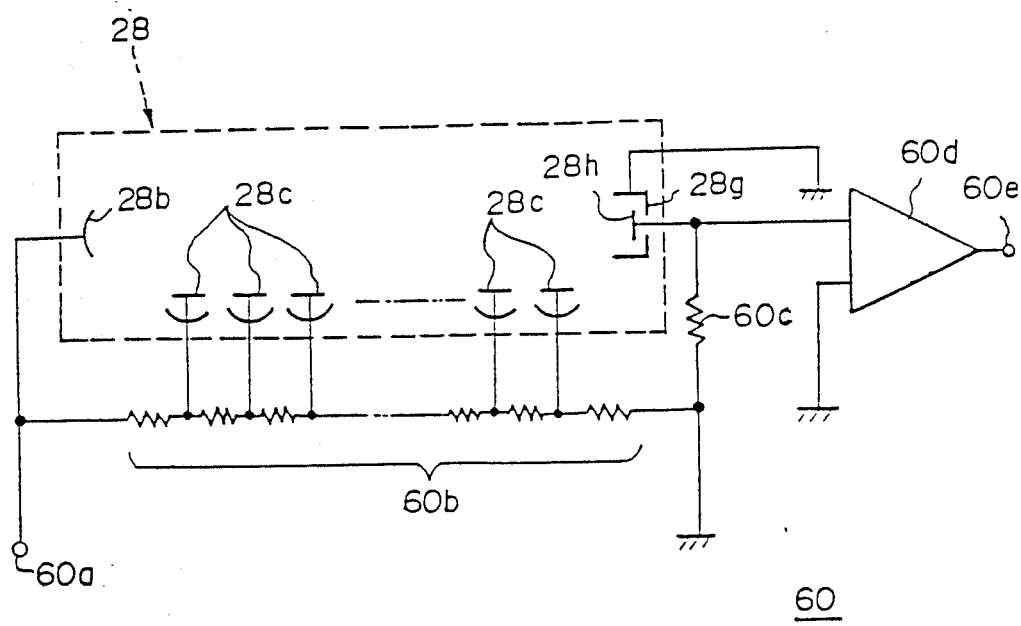
FIG. 7 is a circuit diagram showing the electric circuit for the photomultiplier shown in FIGS. 6A and 6B, and FIGS. 8A, 8B and 9 are side views showing further examples of the recording and read-out unit employed in the radiation image recording and read-out apparatus in accordance with the present invention.

FIG. 7 shows an electric circuit 60 for operating the photomultiplier 28 and obtaining a photoelectric output. In FIG. 7, similar elements are numbered with the same reference numerals with respect to FIG. 6A. A high negative voltage is applied to the photocathode 28b via a high negative voltage applying terminal 60a. The high negative voltage applied to the high negative voltage applying terminal 60a is divided by a bleeder resistance group 60b into voltages which are applied respectively to the dynodes 28c. The shield electrode 28g is grounded, and the anode 28h is grounded via a resistor 60c and is connected with one of terminals of an amplifier 60d. The other terminal of the amplifier 60d is grounded. The photoelectrically converted image information is obtained as electric signals from an output terminal 60e of the amplifier 60d. The electric signals thus obtained are subjected to necessary image processing, and then sent to a display device such as a CRT or an image reproducing apparatus such as a recording apparatus for carrying out light beam scanning recording on a photosensitive film. By way of example, as shown in FIG. 4, a control circuit section 3 housing printed circuit boards or the like for controlling image processing or the like is provided inward of the loop of the recording belt 2.

The portion of the recording belt 2 on which the image read-out had been finished is sent by the first roller section 40 and the second roller section 50 to an erasing section 30. The erasing section 30 comprises a case 31, and a plurality of (by way of example, three) erasing light sources 32, 32, . . . constituted by fluorescent lamps or the like and disposed in the case 31. The erasing light sources 32, 32, . . . mainly produce erasing light having a wavelength within the stimulation wavelength range of the stimulable phosphor layer of the recording belt 2. The erasing light is irradiated to the overall image forming region of the recording belt 2 while the recording belt 2 is being conveyed, thereby to release radiation energy remaining on the stimulable phosphor layer of the recording belt 2 after the image read-out is finished. A lead plate 6 for shielding the radiation is provided below the recording belt 2 at the image recording section 10, and therefore the radiation produced by the radiation source 11 at the time of the image recording does not impinge upon the recording belt 2 positioned in the image read-out section 20 or in the erasing section 30, or does not adversely affect the image read-out section 20 and the erasing section 30. Also, in this embodiment, the image read-out and the erasing are carried out on a single image forming region simultaneously for a predetermined period. The recording belt portion on which the erasing has been finished at the erasing section 30 is conveyed to the image recording section 10 for reuse in image recording.

On the other hand, in the case where an object 5' subjected to the image recording is, for example, thin, and is of the type substantially generating no adverse effects of the scattered radiation, the recording and read-out unit 1 is pulled to its second image recording position as shown in FIG. 2, and the object 5' is placed directly on the upper surface of the recording and read-out unit 1. In the course of the image recording, instead of the radiation source 11, the radiation source 12 is activated, and a radiation image of the object 5' is stored on the recording belt 2 in the recording and read-out unit 1 without the bucky device 80 being used. The read-out of the stored image and the erasing are carried out in the recording and read-out unit 1 in the same manner as mentioned above.

With the recording and read-out unit 1 employed in this embodiment wherein the distance between the two roller sections is adjusted to be approximately equal to the length of a single image area, the image recording section 10 is disposed above the recording belt 2, and the image read-out section 20 and the erasing section 30 are disposed below the recording belt 2, the length of the overall apparatus in the horizontal direction can be decreased to a value approximately equal to the length of a single image area. Also, the recording and read-out unit 1 can be moved easily by use of a simple unit movement means. Accordingly, the bucky device 80 is secured, and the recording and read-out unit 1 is moved with respect to the bucky device 80, so that change-over between the image recording by use of the bucky device 80 and the image recording without the bucky device 80 being used can be effected easily. Also, the distance between the object and the stimulable phosphor sheet can be made short, and therefore an image having a high image quality free from geometric blur can be obtained.

The stimulable phosphor layer need not necessarily be formed over the overall surface of the recording belt 2, and the stimulable phosphor layer extending over a single image area or two image areas may be formed at a part of the recording belt 2. Also, each of the first roller section 40 and the second roller section 50 may be constituted by a single roller or three or more rollers. Instead of providing the two radiation sources, only a single radiation source may be provided and moved together with the recording and read-out unit 1. Alternatively, a single radiation source having a wide irradiation range capable of irradiating the radiation to the first image recording position and the second image recording position of the recording and read-out unit 1 may be secured at a predetermined position. In the case where the image recording is carried out with the object in the standing position, the object support may be omitted. Also, the bucky device 80 may be replaced by an ordinary grid device having no means for reciprocal movement of the grid.

Also, the recording and read-out unit 1 is formed in the small case 7 slightly larger than the recording area for a single image. As such a small recording and read-out unit, different configurations may also be employed. Different examples of the small recording and read-out unit employed in accordance with the present invention will be described hereinbelow.

Figure 8A:
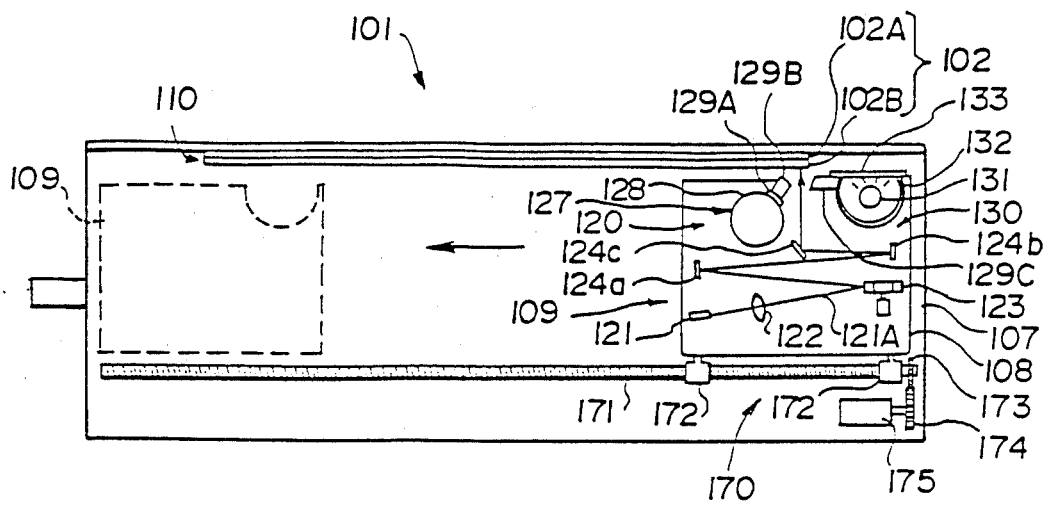
Figure 8B:
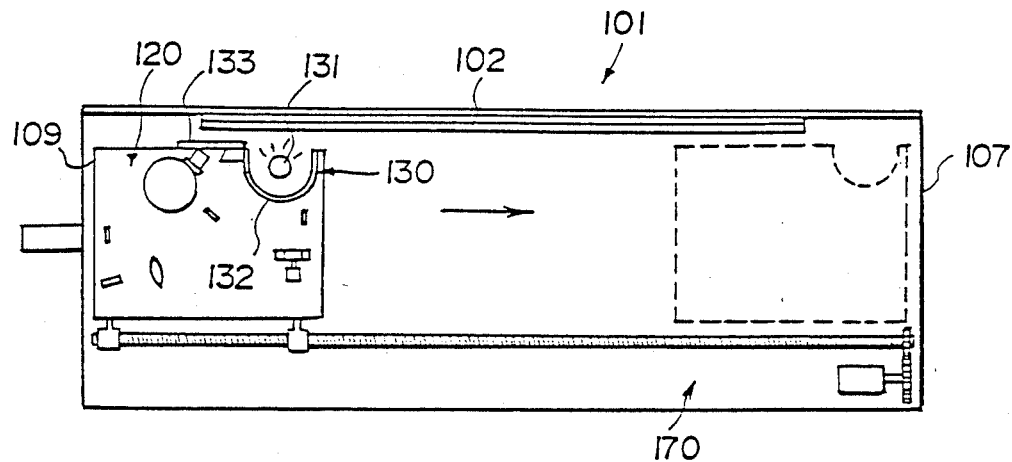

With reference to FIG. 8A and 8B, a stimulable phosphor sheet 102 is secrued horizontally at an image recording section 110 provided at the upper part of a case 107 of a recording and read-out unit 101. The case 107 has a size slightly larger than the size of the stimulable phosphor sheet 102. The stimulable phosphor sheet 102 is composed of a radiation-permeable substrate 102A and a stimulable phosphor layer 102B overlaid on the substrate 102B.

A read-out and erasing section 109 comprising a box 108, and an image read-out section 120 and an erasing section 130 intergrally housed close to each other in the box 108 is provided below the stimulable phosphor sheet 102. The read-out and erasing section 109 is reciprocally moveable while facing the stimulable phosphor sheet 102 between the right end position (first position) as indicated by the solid line in FIG. 8A and the left end position (second position) as indicated by the solid line in FIG. 8B. In this embodiment, movement from the first position to the second position is referred to as forward movement, and movement from the second position to the first position is referred to as backward movement. Also, by way of example, a movement means 170 for reciprocally moving the read-out and erasing section 109 is composed of a screw rod 171 extending in the direction of movement of the read-out and erasing section 109, supporting members 172, 172 engaged with the screw rod 171, a gear 173 secured to the screw rod 171, a gear 174 meshing with the gear 173, and a motor 175 for rotating the gear 174 in the normal and reverse directions. The screw rod 171 is rotated by the motor 175 via the gears 173 and 174, thereby to move the supporting members 172, 172 forward and backward and carry out reciprocal movement of the read-out and erasing section 109.

The recording and read-out unit 101 can be employed as a substitute for the recording and read-out unit 1 in the apparatus shown in FIG. 1. In this case, as in the aforesaid embodiment, the radiation produced by the radiation source and passing through the object 5 or 5' is irradiated to the stimulable phosphor sheet 102 via the bucky device 80 or without the bucky device 80 being used. In this manner, the radiation image is stored on the stimulable phosphor layer 102B of the stimulable phosphor sheet 102.

The image read-out section 120 is provided with a stimulating ray scanning means which comprises a stimulating ray source 121 constituted by a semiconductor laser or the like, a condensing lens 122 disposed in the optical path of stimulating rays 121A produced by the stimulating ray source 121, a rotating polygon mirror 123 as a light deflector for deflecting the stimulating rays 121A passing through the condensing lens 122 at an angle normal to the drawing sheet in FIG. 8A, thereby to scan the stimulating rays 121A in a main scanning direction on the stimulable phosphor sheet 102, and mirrorsd 124a, 124b and 124c for changing the optical path of the stimulating rays 121A. The stimulating rays 121A is made by the stimulating ray scanning means to repeatedly scan the stimulable phosphor sheet 102 in the main scanning direction. On the other hand, simultaneously with the scanning of the stimulating rays 121A in the main scanning direction, the read-out and erasing section 109 is conveyed by the movement means 170 at a predetermined speed leftward in FIG. 8A. As a result, the sub-scanning by the stimulating rays 121A is carried out, and almost the overall surface of the stimulable phosphor sheet 102 is exposed to the stimulating rays 121A. As the stimulable phosphor sheet 102 is exposed to the stimulating rays 121A, the exposed portion of the sheet 102 emits light in proportion to the stored radiation energy, and the emitted light is detected by a photoelectric read-out means 127 of the image read-out section 120.

In this embodiment, the photoelectric read-out means 127 is formed in the same manner as in the recording and read-out unit 1 shown in FIG. 4 and comprises a long photomultiplier 128, a filter 129A, a light guide member 129B, and a mirror 129C for reflecting the light emitted by the stimulable phosphor sheet 102 toward the light receiving face of the light guide member 129B. When the image read-out by the photoelectric read-out means 127 has been finished, as shown in FIG. 8B, the read-out and erasing section 109 is conveyed rightward from its second position to its first position. An erasing means 130 is provided with an erasing light source 131 constitutied by a fluorescent lamp or the like and extending in the main scanning direction, and a reflection plate 132 for reflection the erasing light, that is radiated downward by the erasing light source 131, toward the surface of the stimulable phosphor sheet 102. Also, in this embodiment, the erasing light source 131 is normally turned on. Therefore, a moveable shutter 133 is provided so that it is disposed above the erasing light source 131 as shown in FIG. 8A to shield the erasing light at the time the image recording and the image read-out are carried out, and is retracted to the position above the photomultiplier 128 is shown in FIG. 8B to lay bare the erasing light source 131 only when the erasing is to be carried out. The movable shutter 133 need not necessarily be provided in the case where the erasing light source 131 is turned on only when the erasing is to be carried out, and is turned off in the steps other than the erasing. As the read-out and erasing section 109 is moved in the manner as mentioned above, the erasing light source 131 irradiates the erasing light to the overall surface of the stimulable phosphor sheet 102. The erasing light source 131 mainly produces light having a wavelength within the stimulation wavelength range of the stimulable phosphor sheet 102, and radiation energy remaining on the sheet 102 after the image read-out therefrom has been carried out is released from the sheet 102 when the sheet 102 is exposed to the erasing light. The stimulable phosphor sheet 102 thus erased can be reused for image recording, and the read-out erasing section 109 is returned to its first position.

With the recording and read-out unit 101 wherein a single stimulable phosphor sheet 102 is secured and held, and the image read-out and erasing are carried out by reciprocally moving the read-out and erasing section 109, the length of the recording and read-out unit 101 can be decreased nearly to the length of a single stimulable phosphor sheet 102.

In the recording and read-out unit 101, the stimulating rays 121A are scanned and the light emitted by the stimulable phosphor sheet 102 is detected by the photomultiplier 128. However, as proposed in, for example, Japanese Patent Application No. 62(1987)-21957, it is also possible to linearly irradiate the stimulating rays to the stimulable phosphor sheet 102, and to detect the emitted light by a line sensor. This also applies to the recording and read-out unit 1 shown in FIG. 4, and the recording and read-out units will be described later.

A further example of the recording and read-out unit employed in accordance with the present invention will hereinbelow be described with reference to FIG. 9. In a case 207 of a recording and read-out unit 201 shown in FIG. 9, a first wind-up shaft 241 and a second wind-up shaft 242 are provided in spaced and parallel relation to each other. The distance between the first wind-up shaft 241 and the second wind-up shaft 242 is adjusted to be slightly longer than the length of a single image area of the image recorded on a stimulable phosphor sheet 202 as will be described later. The first wind-up shaft 241 and the second wind-up shaft 242 are respectively rotated by motors 243 and 244 as the sheet feed means counter-clockwise and clockwise in FIG. 9. One end side of the stimulable phosphor sheet 202 capable of storing the radiation image thereon is wound around the first wind-up shaft 241. The stimulable phosphor sheet 202 is formed in the long striplike shape by use of a flexible substrate. The other end side of the stimulable phosphor sheet 202 is supported by the second wind-up shaft 242 so that the sheet 202 can be wound up therearound. Also, the stimulable phosphor sheet 202 is applied between a roller 246 and rollers 247, 247 disposed between the first wind-up shaft 241 and the second wind-up shaft 242. The stimulable phosphor sheet 202 is positioned so that the flexible substrate substantially permeable to the radiation faces up and the stimulable phosphor layer overlaid on the substrate faces down. With the recording and read-out unit 201, the recording of the radiation image of the object is carried out in the same manner as with the aforesaid recording and read-out units 1 and 101. Specifically, in the recording and read-out unit 201, an image recording section 210 is formed between the roller 246 and the rollers 247, 247.

An image read-out section 220 is provided below the stimulable phosphor sheet 202 in the vicinity of the second wind-up shaft 242. The image read-out section 220 is constituted by a stimulating ray source 221 which may be a semiconductor laser, a rotating polygon mirror 223 as a light deflector for reflecting and deflecting stimulating rays 221A produced by the stimulating ray source 221, a long mirror 224 for reflecting the deflected stimulating rays 221A so that the stimulating rays 221A one-dimensionally scans the stimulable phosphor sheet 202, specifically the stimulable phosphor layer thereof, the drive rollers 247, 247 composed of a pair of nip rollers for grasping the stimulable phosphor sheet 202 therebetween and acting as a sub-scanning means rotated at a predetermined speed, a long photomultiplier 227 disposed so that the light receiving face thereof extends along the scanning line (main scanning line) of the stimulating rays 221A on the stimulable phosphor sheet 202, and a long light guiding reflection mirror 229 extending along the long photomultiplier 227. In this embodiment, the photomultiplier 227 has the electrode configuration referred to as the box type. However, the photomultiplier of the type as shown in FIGS. 6A and 6B may also be employed. After a radiation image of the object is stored on the stimulable phosphor sheet 202 in the manner as mentioned above, the drive rollers 274, 247 are rotated to convey the stimulable phosphor sheet 202 at a predetermined speed rightward in FIG. 9. At this time, the second wind-up shaft 242 is rotated to wind up the stimulable phosphor sheet 202 therearound. An appropriate load has been given to the first wind-up shaft 241 by a known means (not shown) to maintain the stimulable phosphor sheet 202 in the tensioned condition. As the stimulable phosphor sheet 202 is thus conveyed, the stimulating ray source 221 and the rotating polygon mirror 223 are operated so that the stimulating rays 221A scan the stimulable phosphor sheet 202. The portion of the stimulable phosphor sheet 202 exposed to the stimulating rays 221A emits the light carrying the radiation image stored on the stimulable phosphor 202. The emitter light is efficiently detected by the photomultiplier 227 directly or after being reflected by the light guiding reflection mirror 229. Simultaneously with the main scanning of the stimulating rays 221A, the stimulable phosphor sheet 202 is conveyed in the sub-scanning direction, and consequently the detection of the light emitted by the stimulable phosphor sheet 202 is carried out two-dimensionally.

The portion of the stimulable phosphor sheet 202 for which the image read-out has been finished in the manner as mentioned above is wound up around the second wind-up shaft 242. Also, a subsequent portion of the stimulable phosphor sheet 202 that has been wound around the first wind-up shaft 241 is fed to the position between the roller 246 and the drive rollers 247, 247, and it becomes possible to record a radiation image on said portion of the sheet 202 in the same manner as mentioned above. After the radiation image recording has thus carried out over approximately the overall length of the stimulable phosphor sheet 202 and the sheet 202 that has been wound around the first winde-up shaft 241 has been delivered toward the second wind-up shaft 242, the motor 243 is operated to rotate the first wind-up shaft 241 counter-clockwise. Thus the stimulable phosphor sheet 202 on which the image read-out has been finished and which has been wound around the second wind-up shaft 242 is returned to the first wind-up 241. At this time, the stimulable phosphor sheet 202 passes over an erasing section 230 provided between the roller 246 and the drive rollers 247, 247, and is subjected to image (residual image) erasing. By way of example, the erasing section 230 is constituted by a plurality of erasing light sources 231, 231, . . . positioned below the stimulable phosphor sheet 202. The erasing light sources 231, 231, . . . are constituted by fluorescent lamps or the like, and produce erasing light having a wavelength within the stimulation wavelength range for the stimulable phosphor of the stimulable phosphor sheet 202. The erasing light sources 231, 231, . . . are turned on at the time the stimulable phosphor sheet 202 is returned to the first wind-up shaft 241. Upon exposure to the erasing light, the radiation energy remaining on the stimulable phosphor sheet 202 after the image read-out therefrom has been finished is released from the sheet 202.

In this manner, the stimulable phosphor sheet 202 on which the image (residual image) erasing has been effected to such an extent that the sheet 202 can be reused for the radiation image recording is stored around the first wind-up shaft 241. Therefore, the radiation image recording and the read-out can be repeated by use of the erased reusable stimulable phosphor sheet 202.

Figure 9:
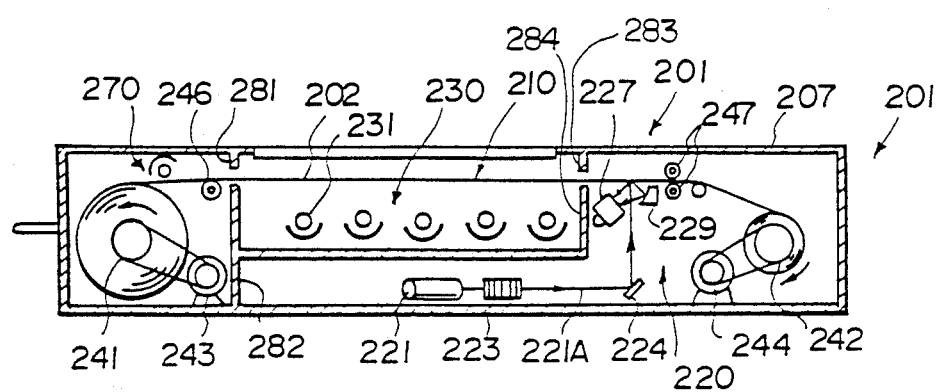

In the embodiment shown in FIG. 9, a secondary erasing light source 270 for carrying out secondary erasing is provided between the first wind-up shaft 241 and the image recording section 210. The secondary erasing light source 270 is composed of a light source of the same type as the erasing light sources 231, . . . 231 at the erasing section 230, and is turned on to irradiate the erasing light to the stimulable phosphor sheet 202 at the time the sheet 202 is delivered from the first wind-up shaft 241 for carrying out the radiation image recording. In the case where the stimulable phosphor sheet 202 has been stored around first wind-up shaft 241 without being used for a long period after being subjected to the image (residual image) erasing at the erasing section 230, the stimulable phosphor sheet 202 stored energy of radiations emitted by radioactive isotopes such as Ra226, which are contained as impurities in the stimulable phosphor, or energy of environmental radiations. These types of radiation energy undesirably stored on the stimulable phosphor sheet 202 cause noise in a radiation image recorded next on the stimulable phosphor sheet 202. Exactly prior to the image recording, such radiation energy is erased by exposing the stimulable phosphor sheet 202 to the secondary erasing light produced by the secondary erasing light source 270. The secondary erasing light is intercepted by light shielding plates 281 and 282 so that the sheet 202 prior to the image read-out is not exposed thereto.

In the aforesaid embodiment shown in FIG. 9, the radiation image stored on the stimulable phosphor sheet 202 is read out at the image read-out section 220 immediately after the image recording is carried out. However, the embodiment may also be used for repeating the image recording prior to the image read-out at the image read-out section 220. In this case, the image-recorded portions of the stimulable phosphor sheet 202 are wound up around the second wind-up shaft 242 without carrying out the image read-out. After the sequential image recording is thus finished, the stimulable phosphor sheet 202 is returned from the second wind-up shaft 242 toward the first wind-up shaft 241, and the image read-out is carried out at the image read-out section 220 in the course of said returning of the sheet 202. In this case, the erasing light produced by the erasing light sources 231, 231, . . . is intercepted by light shielding plates 283 and 284 so that the stimulable phosphor sheet 202 prior to the image read-out is not exposed thereto.

Also, the recording and read-out unit employed in accordance with the present invention may be constituted by a unit as proposed in Japanese Patent Application No. 60(1985)-232518 and composed of a case in which an image recording section, an image read-out section and an erasing section are housed, and a slit formed in a side surface of the case, through which a stimulable phosphor sheet is to be passed. With such a unit, the image recording is carried out with the stimulable phosphor sheet housed in the case, and the image read-out is carried out at the time the stimulable phosphor sheet is being moved out of the case through the slit. The erasing may be carried out while the stimulable phosphor sheet is being returned into the case, or by irradiating the erasing light to the overall surface of the stimulable phosphor sheet which has been returned into the case.

I claim:

1. A radiation image recording and read-out apparatus which comprises:
   (i) a recording and read-out unit provided with:
       (a) a case for housing therein a stimulable phosphor sheet and having longitudinal and transverse dimensions approximately equal to the longitudinal and transverse dimensions of a single image recording area on said stimulable phosphor sheet,
       (b) an image recording section for holding said stimulable phosphor sheet is said case at an image recording position exposed to radiation passing through an object, and having a radiation image of said object stored on said stimulable phosphor sheet,
       (c) an image read-out section provided in said case for exposing said stimulable phosphor sheet carrying said radiation image stored thereon to stimulating rays which cause said stimulable phosphor sheet to emit light in proportion to the stored radiation energy, and photoelectrically detecting the emitted light to obtain image signals, and
       (d) an erasing section provided in said case for releasing the radiation energy remaining on said stimulable phosphor sheet, for which the detection of said emitted light has been carried out, before the image recording is carried out on said stimulable phosphor sheet,
   (ii) a grid device provided with a grid having a size approximately equal to the longitudinal and transverse dimensions of said case, and
   (iii) a unit movement means for moving said recording and read-out unit so that said recording and read-out unit takes a first image recording position at which said image recording section faces said grid device, and a second image recording position at which said image recording section deviates from the position facing said grid device.

2. An apparatus as defined in claim 1 wherein said stimulable phosphor sheet is shaped in an endless belt-like form, said stimulable phosphor sheet in the endless belt-like form is held at said image recording position by being applied around two sets of roller sections which are spaced from each other by a distance approximately equal to the length of a single image area, and in the course of feeding the image-recorded portion of said stimulable phosphor sheet out of said image recording position and feeding a different portion of said stimulable phosphor sheet to said image recording position, said stimulating rays are scanned in a sub-scanning direction by the movement of said stimulable phosphor sheet, whereby the detection of said light emitted by said stimulable phosphor sheet is carried out.

3. An apparatus as defined in claim 1 wherein said stimulable phosphor sheet is secured at said image recording position, said image read-out section and said erasing section are provided on a moveable body for movement along the surface of said stimulable phosphor sheet, and said stimulating rays are scanned in a sub-scanning direction by the movement of said moveable body, thereby to carry out the direction of said light emitted by said stimulable phosphor sheet, and the image erasing is carried out by the movement of said moveable body.

4. An apparatus as defined in claim 1 wherein said stimulable phosphor sheet is formed as a long strip-like flexible sheet, one end and the other end of said stimulable phosphor sheet are respectively wound around a first wind-up shaft and a second wind-up shaft, whereby said stimulable phosphor sheet is applied at the image recording position between said first wind-up shaft and said second wind-pu shaft, and said stimulating rays are scanned in a sub-scanning direction by the wind-up movement of said stimulable phosphor sheet between said first wind-up shaft and said second wind-up shaft, whereby the detection of said light emitted by said stimulable phosphor sheet is carried out.

5. An apparatus as defined claim 1 wherein an opening through which said stimulable phosphor sheet is to be passed is formed at one end of said case which one end faces an edge of said stimulable phosphor sheet, and said stimulating rays are scanned in a sub-scanning direction by such movement of said stimulable phosphor sheet that said stimulable phosphor sheet is projected out of said case through said opening from said image recording section, whereby the detection of said light emitted by said stimulable phosphor sheet is carried out.

* * * * *